(12) United States Patent
Akutsu et al.

(10) Patent No.: US 12,482,819 B2
(45) Date of Patent: Nov. 25, 2025

(54) SOLID-STATE BATTERY AND METHOD OF MANUFACTURING SOLID-STATE BATTERY

(71) Applicant: HONDA MOTOR CO., LTD., Tokyo (JP)

(72) Inventors: Shigemitsu Akutsu, Saitama (JP); Shinji Fujimoto, Saitama (JP); Toru Sukigara, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 670 days.

(21) Appl. No.: 17/664,425

(22) Filed: May 23, 2022

(65) Prior Publication Data

US 2022/0384803 A1 Dec. 1, 2022

(30) Foreign Application Priority Data

May 25, 2021 (JP) ................................ 2021-087643

(51) Int. Cl.
| | |
|---|---|
| *H01M 4/525* | (2010.01) |
| *H01M 4/04* | (2006.01) |
| *H01M 4/505* | (2010.01) |
| *H01M 10/0562* | (2010.01) |
| *H01M 4/02* | (2006.01) |

(52) U.S. Cl.
CPC ......... *H01M 4/525* (2013.01); *H01M 4/0404* (2013.01); *H01M 4/0407* (2013.01); *H01M 4/505* (2013.01); *H01M 10/0562* (2013.01); *H01M 2004/027* (2013.01); *H01M 2004/028* (2013.01); *H01M 2300/0068* (2013.01)

(58) Field of Classification Search
CPC .. H01M 4/525; H01M 4/0404; H01M 4/0407; H01M 4/505; H01M 10/0562; H01M 2004/027; H01M 2004/028; H01M 2300/0068
See application file for complete search history.

(56) References Cited

U.S. PATENT DOCUMENTS

| | | |
|---|---|---|
| 2003/0054256 A1 | 3/2003 | Takahashi et al. |
| 2020/0343592 A1 | 10/2020 | Kawamura et al. |
| 2021/0296739 A1* | 9/2021 | Akutsu ............... H01M 10/056 |

(Continued)

FOREIGN PATENT DOCUMENTS

| | | |
|---|---|---|
| CN | 111463478 A | 7/2020 |
| CN | 112424975 A | 2/2021 |

(Continued)

OTHER PUBLICATIONS

Office Action issued in the CN Patent Application No. 202210564989.3, mailed on Apr. 15, 2024.
(Continued)

*Primary Examiner* — Milton I Cano
(74) *Attorney, Agent, or Firm* — CKC & Partners Co., LLC

(57) ABSTRACT

Provide is a solid-state battery capable of reducing the lamination space factor of a solid electrolyte and reducing electrical resistivity. A solid-state battery includes: a laminate including a positive electrode plate and a negative electrode plate that are alternately laminated; and a solid electrolyte layer formed on at least one of a lamination surface of the positive electrode plate and a lamination surface of the negative electrode plate.

2 Claims, 19 Drawing Sheets

(56) References Cited

U.S. PATENT DOCUMENTS

| | | | | |
|---|---|---|---|---|
| 2021/0296743 A1* | 9/2021 | Akutsu | ............... | H01M 50/124 |
| 2021/0305630 A1* | 9/2021 | Ohta | ................... | H01M 50/593 |
| 2022/0384802 A1* | 12/2022 | Akutsu | ............. | H01M 10/0418 |

FOREIGN PATENT DOCUMENTS

| | | | |
|---|---|---|---|
| JP | 2003109666 | A | 4/2003 |
| JP | 2010205479 | A | 9/2010 |
| JP | 2015153663 | A | 8/2015 |
| JP | 2016021281 | A | 2/2016 |
| JP | 2017142889 | A | 8/2017 |
| JP | 2020184413 | A | 11/2020 |
| WO | 2020017467 | A1 | 1/2020 |

OTHER PUBLICATIONS

Notification of Reasons for Refusal issued Dec. 3, 2024 in the JP Patent Application No. 2021-087643.

\* cited by examiner

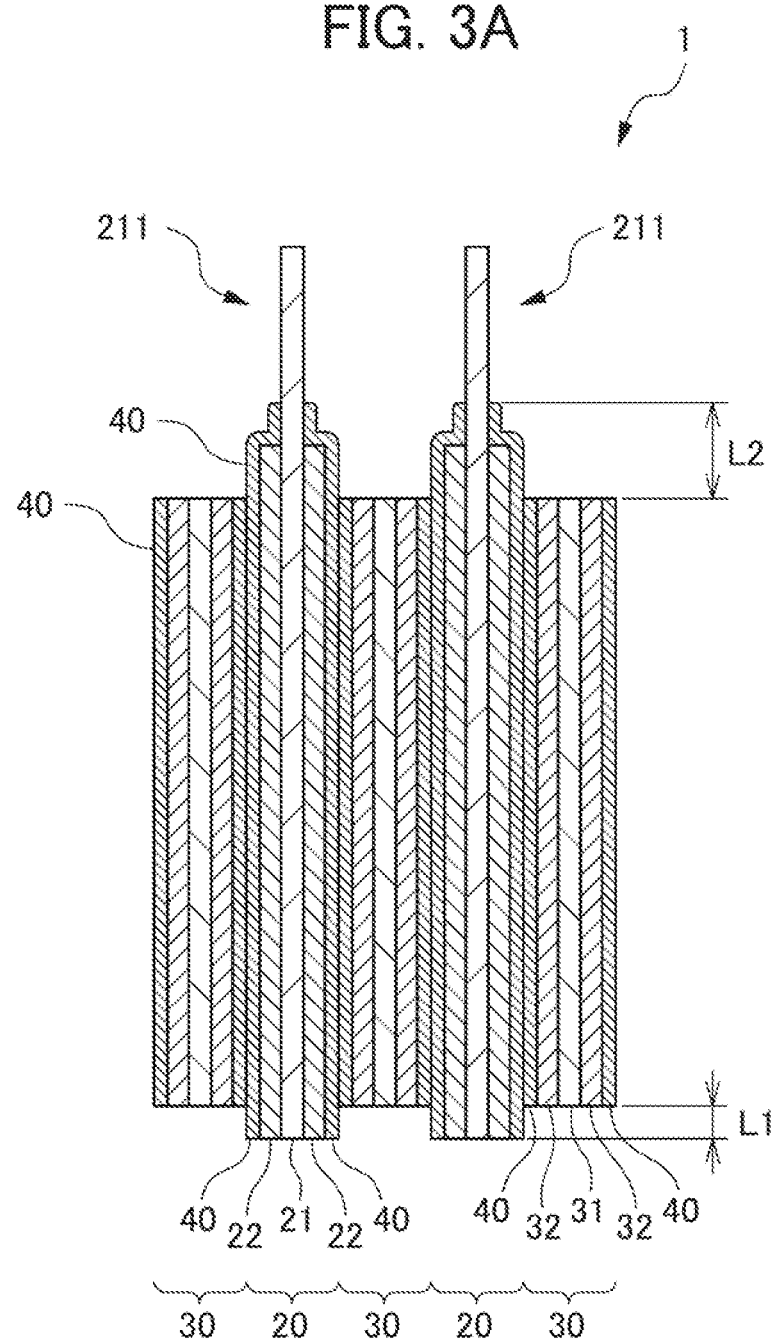

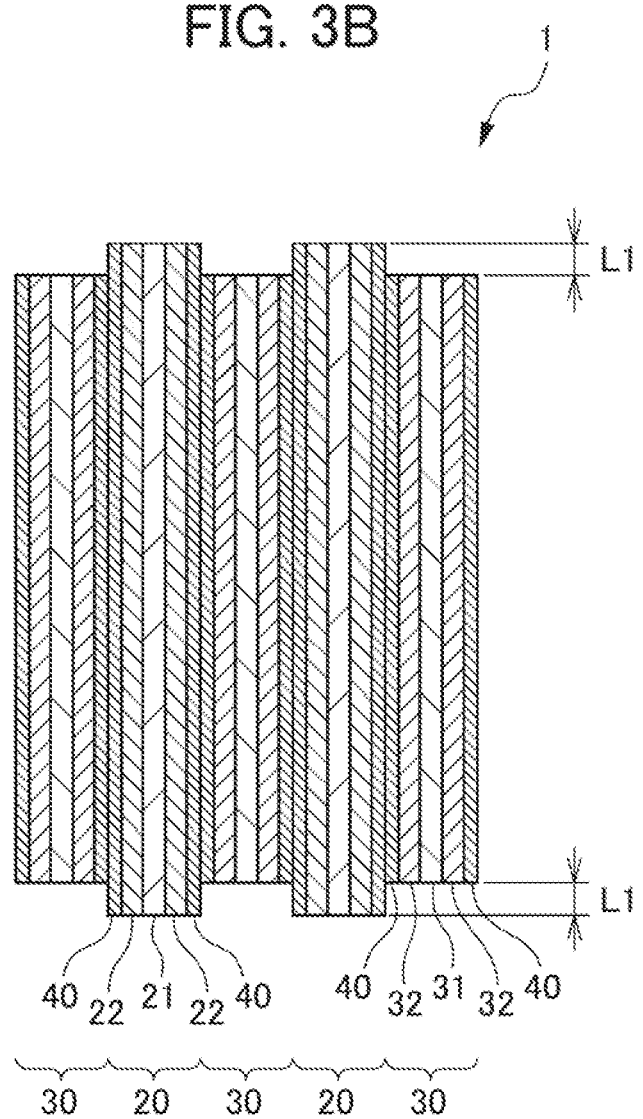

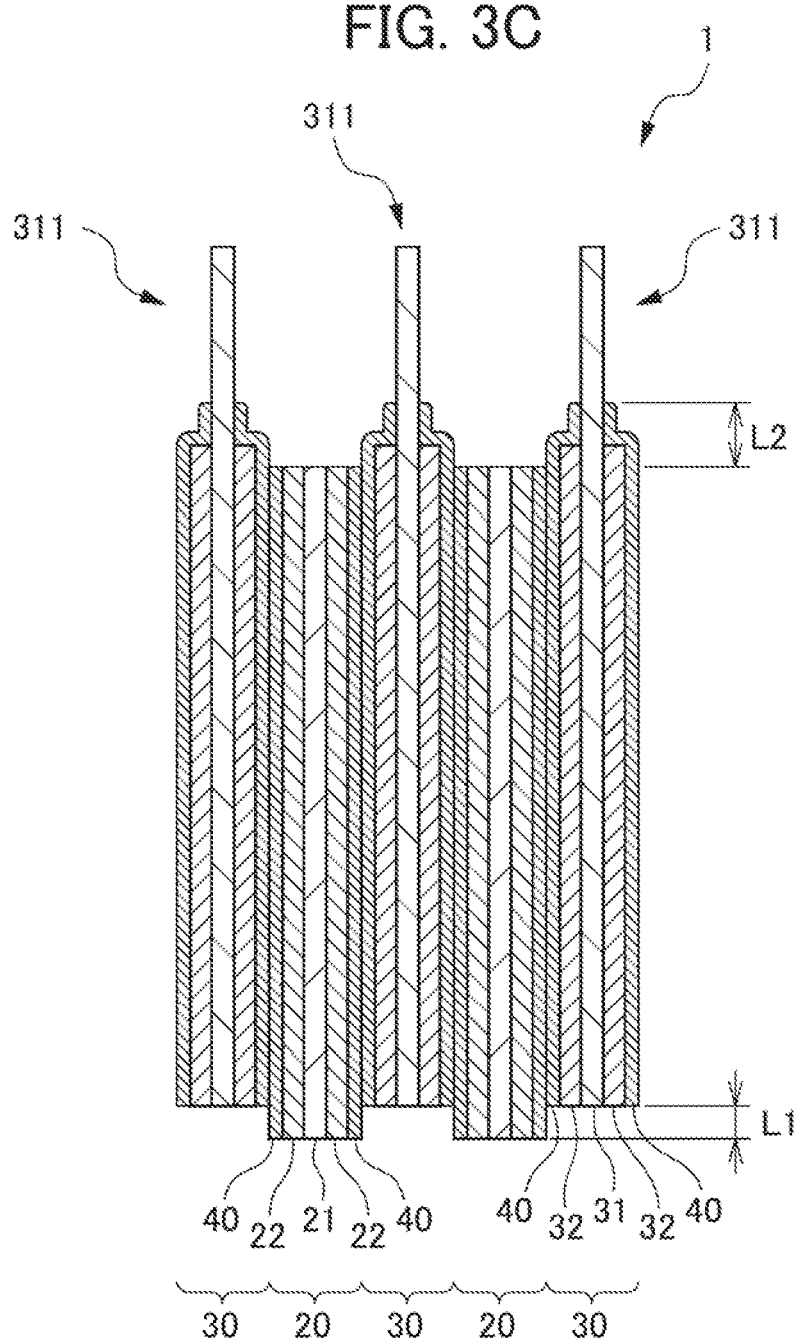

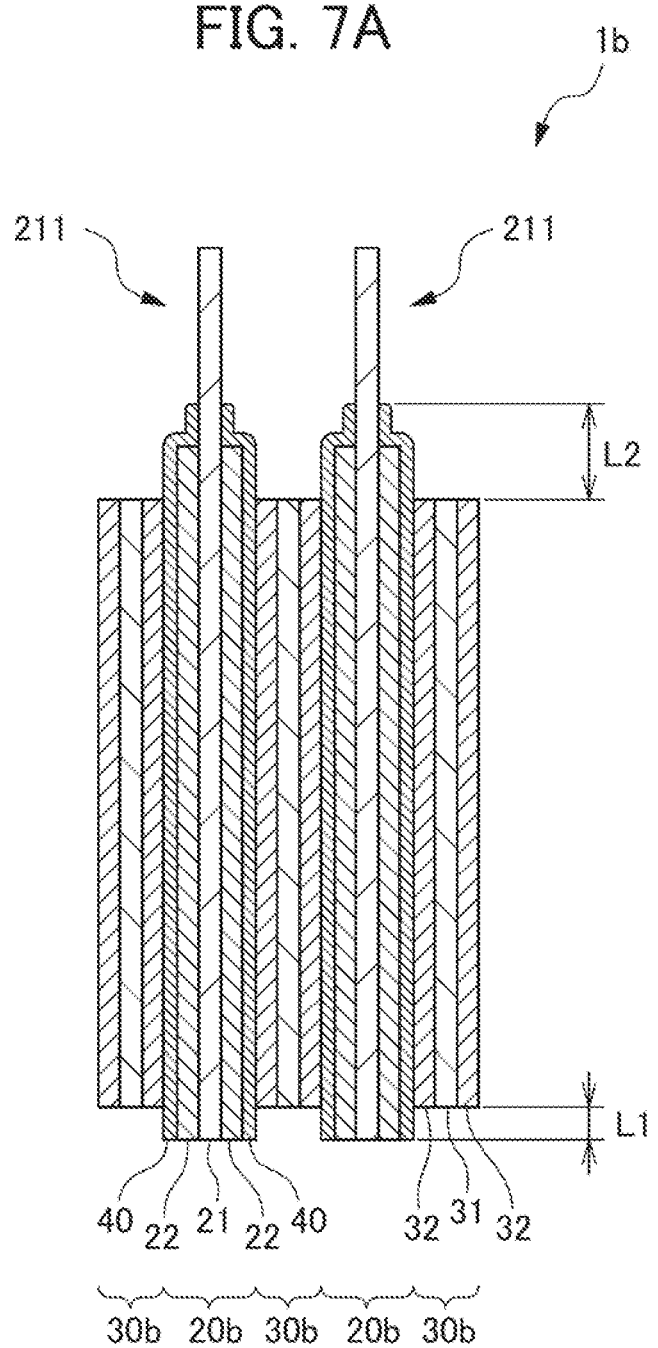

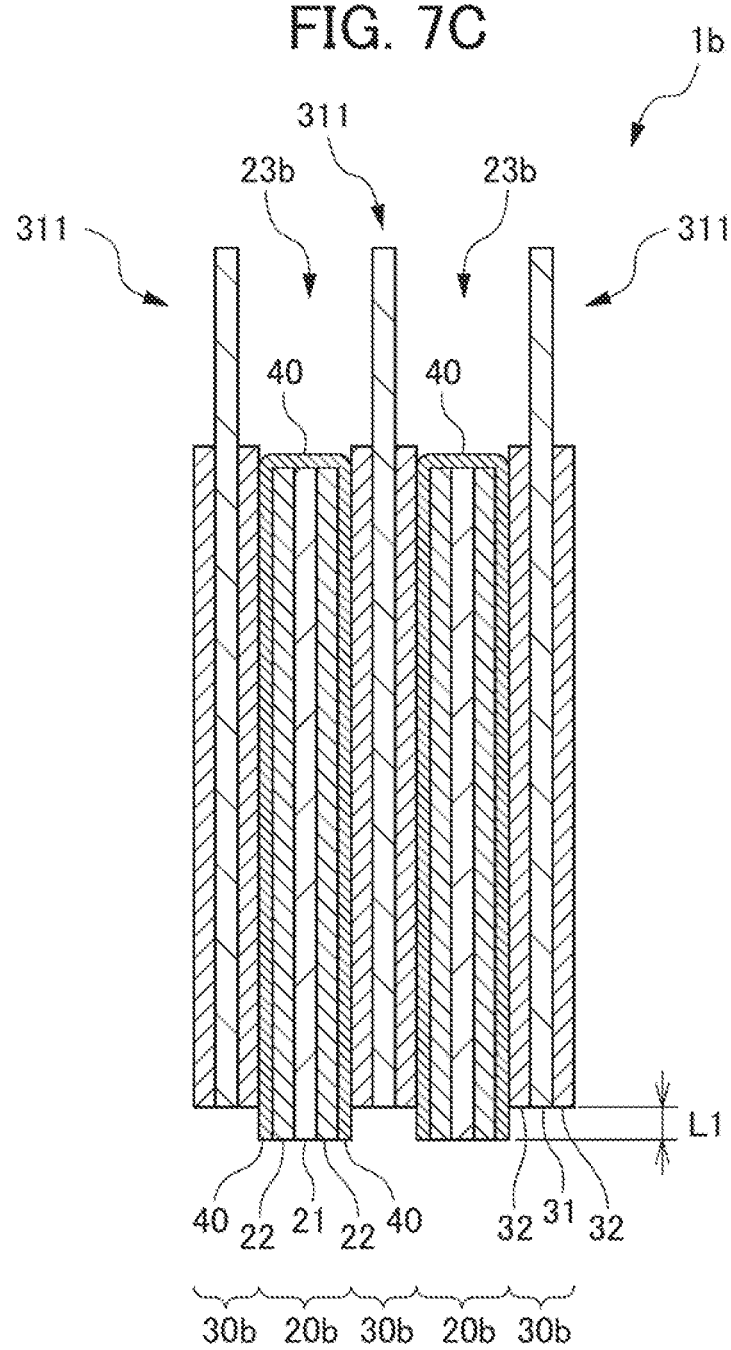

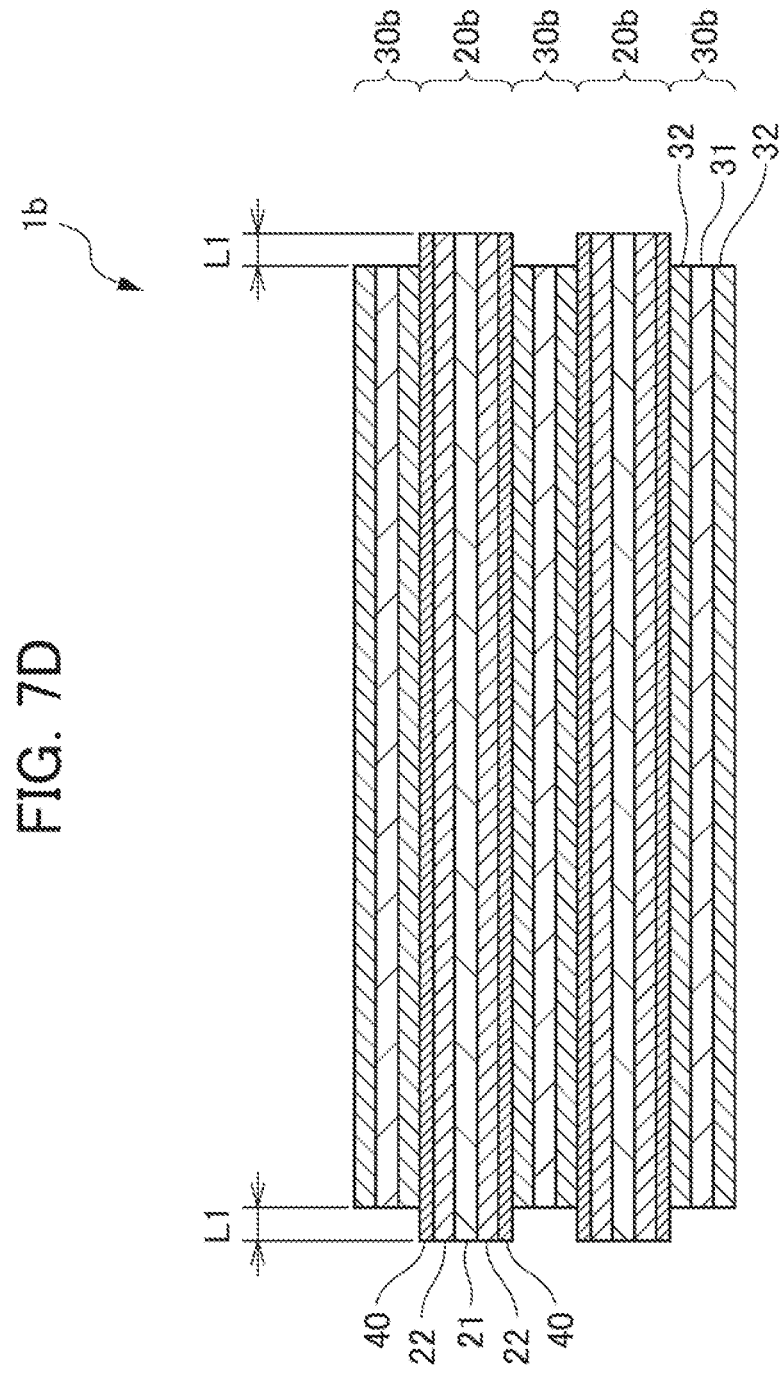

SOLID-STATE BATTERY AND METHOD OF MANUFACTURING SOLID-STATE BATTERY

This application is based on and claims the benefit of priority from Japanese Patent Application No. 2021-087643, filed on 25 May 2021, the content of which is incorporated herein by reference.

BACKGROUND OF THE INVENTION

Field of the Invention

The present invention relates to a solid-state battery and a method of manufacturing a solid-state battery.

Related Art

Lithium-ion secondary batteries have been conventionally widely used as secondary batteries having a high energy density. A lithium-ion secondary battery has a structure in which a separator is present between a positive electrode and a negative electrode and the structure is filled with a liquid electrolyte.

The electrolytic solution of the lithium-ion secondary battery is usually a flammable organic solvent, which may cause a particular problem in terms of safety against heat. Therefore, a solid-state battery including an inorganic solid electrolyte instead of the organic liquid electrolyte has been proposed. For example, a technique relating to a solid-state battery including a laminate having a positive electrode layer, a negative electrode layer, and a solid electrolyte layer arranged between the positive electrode layer and the negative electrode layer has been proposed (see Patent Document 1).

Patent Document 1: Japanese Unexamined Patent Application, Publication No. 2010-205479

SUMMARY OF THE INVENTION

In the solid-state battery disclosed in Patent Document 1, a sheet-shaped solid electrolyte layer formed by compression molding is arranged between respective electrode layers. Since the sheet-shaped solid electrolyte layer is required to have strength, it is necessary to have a thickness of about several tens of μm. Therefore, there is room for improvement in that the lamination space factor of the solid electrolyte increases and the electrical resistivity increases due to increase in the distance between electrodes.

The present invention has been made in view of the above circumstances, and has an object to provide a solid-state battery capable of reducing the lamination space factor of a solid electrolyte and reducing electrical resistivity.

A first aspect of the present invention is directed to a solid-state battery including: a laminate including a positive electrode plate and a negative electrode plate that are alternately laminated; and a solid electrolyte layer formed on at least one of a lamination surface of the positive electrode plate and a lamination surface of the negative electrode plate.

The first aspect of the present invention provides a solid-state battery capable of reducing the lamination space factor of the solid electrolyte and reducing electrical resistivity.

A second aspect of the present invention is directed to the solid-state battery of the first aspect, in which the solid electrolyte layer is formed on at least a part of at least one of an end face of the positive electrode plate and an end face of the negative electrode plate.

The second aspect of the present invention makes it possible to ensure the insulation between the at least one of the end faces of the positive electrode plate and the negative electrode plate and the other of the end faces.

A third aspect of the present invention is directed to the solid-state battery of the first or second aspect, in which the lamination surface of one electrode plate of the positive electrode plate and the negative electrode plate is larger in area than the lamination surface of the other electrode plate of the positive electrode plate and the negative electrode plate, an outer edge of the one electrode plate is positioned outside an outer edge of the other electrode plate, and the solid electrolyte layer is formed on at least a part of the end face of the one electrode plate.

The third aspect of the present invention makes it possible to ensure the insulation between the electrode plates even when a thin solid electrolyte layer is formed on the electrode plate instead of the sheet-shaped solid electrolyte layer.

A fourth aspect of the present invention is directed to the solid-state battery of the third aspect, in which the end face of the one electrode plate has a concave portion that is formed at a position corresponding to an electrode tab extending from the other electrode plate and that is larger in width than the electrode tab, the solid electrolyte layer is formed on the concave portion, and the solid electrolyte layer is formed on the lamination surface of the one electrode plate.

The fourth aspect of the present invention makes it possible to ensure the insulation between the end face of the one electrode plate and the electrode tab extending from the other electrode plate, and makes it possible to form the laminate without forming any solid electrolyte layer on the other electrode plate. Therefore, it is possible to simplify the manufacturing process of the solid-state battery.

A fifth aspect of the present invention is directed to the solid-state battery of the third aspect, in which the solid electrolyte layer is formed on the lamination surface of the positive electrode plate and the lamination surface of the negative electrode plate, the end face of the one electrode plate has a concave portion that is formed at a position corresponding to an electrode tab extending from the other electrode plate and that is larger in width than the electrode tab, and the solid electrolyte layer is formed on the concave portion.

The fifth aspect of the present invention makes it possible to form the laminate capable of ensuring the insulation between the end face of the one electrode plate and the electrode tab extending from the other electrode plate.

A sixth aspect of the present invention is directed to a method of manufacturing a solid-state battery, the method including a process for producing an electrode for a solid-state battery. The process for producing an electrode for a solid-state battery includes, in sequence: an electrode material coating step of coating a current collecting plate with an electrode material; a perforating step of forming a hole in a part of the current collecting plate coated with the electrode material; a solid electrolyte coating step of coating the current collecting plate having the hole formed therein with a solid electrolyte; and a cutting step of cutting the current collecting plate coated with the solid electrolyte along a cutting line extending across the hole so that a concave portion is formed on an end surface of the current collecting plate.

The sixth aspect of the present invention makes it possible to efficiently produce the electrode plates having the solid electrolyte layer formed on at least parts of end faces thereof, and reduce the manufacturing cost of the solid-state battery.

BRIEF DESCRIPTION OF THE DRAWINGS

FIG. 3A is a cross-sectional view taken along a line A-A of FIG. 2;

FIG. 3B is a cross-sectional view taken along a line B-B of FIG. 2;

FIG. 3C is a cross-sectional view taken along a line C-C of FIG. 2;

FIG. 7A is a cross-sectional view taken along a line A-A of FIG. 6;

FIG. 7C is a cross-sectional view taken along a line C-C of FIG. 6;

FIG. 7D is a cross-sectional view taken along a line D-D of FIG. 6;

DETAILED DESCRIPTION OF THE INVENTION

First Embodiment

Figure 1:
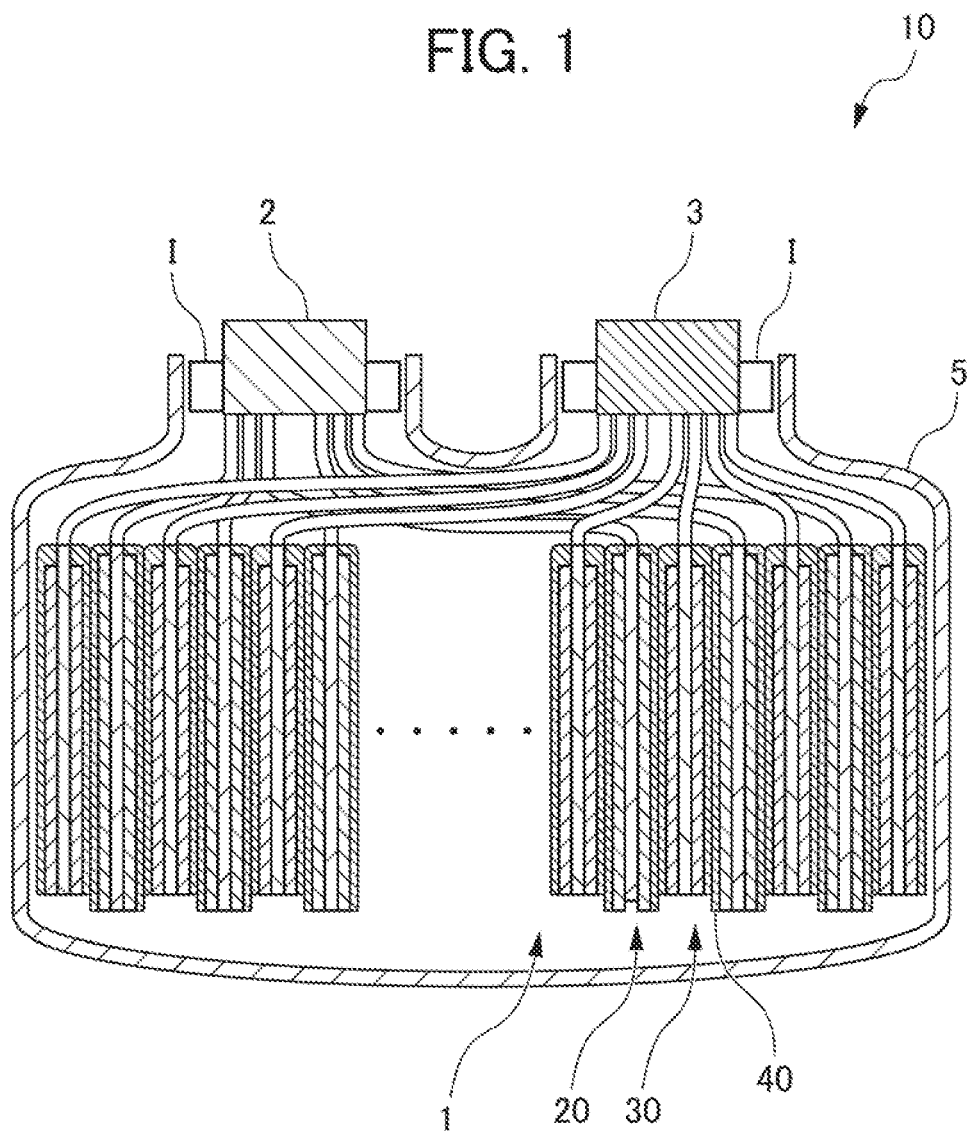
FIG. 1 is a diagram showing an outline of a solid-state battery according to a first embodiment of the present invention.

<Solid-State Battery>
FIG. 1 is a schematic cross-sectional view showing a solid-state battery 10 according to an embodiment of the present invention. As shown in FIG. 1, the solid-state battery 10 includes a laminate 1 formed by alternately laminating a plurality of positive electrode plates 20 and a plurality of negative electrode plates 30 as electrode plates. The laminate 1 is accommodated in an outer packaging body 5. The plurality of positive electrode plates 20 are electrically connected to a positive electrode 2, and the plurality of negative electrode plates 30 are electrically connected to a negative electrode 3. An insulator I is arranged around the positive electrode 2 and the negative electrode 3.

(Positive Electrode Plate)
As shown in FIGS. 2 and 3A to 3D, the positive electrode plate 20 includes a positive electrode current collecting plate 21, a positive electrode active material layer 22 which is formed on the positive electrode current collecting plate 21 and contains a positive electrode active material, a solid electrolyte layer 40 which is formed on the positive electrode active material layer 22 and contains a solid electrolyte, and a positive electrode tab 211 formed by extending the positive electrode current collecting plate 21.

The positive electrode current collecting plate 21 is not particularly limited, and is formed of a known current collecting material that can be used for the positive electrode of a solid-state battery. It is formed of, for example, aluminum, aluminum alloy, stainless steel, nickel, iron, titanium, or the like.

The positive electrode active material constituting the positive electrode active material layer 22 is not particularly limited, and a known material capable of occluding and releasing a charge transfer medium such as lithium ion can be appropriately selected and used. Examples of the positive electrode active material include lithium cobaltate, lithium nickelate, lithium manganate, heterogeneous element substituted Li—Mn spinel, lithium metal phosphate, lithium sulfide, sulfur, and the like. Specific Examples of the positive electrode active material include $LiCoO_2$, $Li(Ni_{5/10}Co_{2/10}Mn_{3/10})O_2$, $Li(Ni_{6/10}Co_{2/10}Mn_{2/10})O_2$, $Li(N_{8/10}Co_{1/10}Mn1/10)O_2$, $Li(Ni_{0.8}Co_{0.15}Al_{0.05})O_2$, $Li(Ni_{1/6}Co_{4/6}Mn_{1/6})O_2$, $Li(Ni_{1/3}Co_{1/3}Mn_{1/3})O_2$, $LiCoO_4$, $LiMn_2O_4$, $LiNiO_2$, $LiFePO_4$, etc. In addition to the positive electrode active material, the positive electrode active material layer 22 may optionally contain a conductive auxiliary agent, a binder, or the like.

(Negative Electrode Plate)
As shown in FIGS. 2 and 3A to 3D, the negative electrode plate 30 includes a negative electrode current collecting plate 31, a negative electrode active material layer 32 which is formed on the negative electrode current collecting plate 31 and contains a negative electrode active material, a solid electrolyte layer 40 which is formed on the negative electrode active material layer 32 and contains a solid electrolyte, and a negative electrode tab 31*l* formed by extending the negative electrode current collecting plate 31.

The negative electrode current collecting plate 31 is not particularly limited, and is formed of a known current collecting material that can be used for the negative electrode of the solid-state battery. For example, it is formed of nickel, copper or a copper alloy, stainless steel, or the like.

The negative electrode active material constituting the negative electrode active material layer 32 is not particularly limited, and a known material capable of occluding and releasing a charge transfer medium such as lithium ion can be appropriately selected and used. Examples of the negative electrode active material include lithium transition metal oxides such as lithium titanate, transition metal oxides such as $TiO_2$, $Nb_2O_3$ and $WO_3$, Si, SiO, metal sulfides, metal nitrides, carbon materials such as artificial graphite, natural graphite, graphite, soft carbon and hard carbon, metallic lithium, metallic indium, and lithium alloys. In addition to the negative electrode active material, the negative electrode active material layer 32 may optionally contain a conductive auxiliary agent, a binder, and the like.

The solid electrolyte layer 40 is a layer having a thickness of about several μm and formed on the positive electrode active material layer 22 and the negative electrode active material layer 32, which constitute lamination surfaces of the laminate 1. The solid electrolyte layer 40 contains at least a solid electrolyte material which is a solid or gelatinous electrolyte. Charge transfer between the positive electrode active material and the negative electrode active material can be performed through the solid electrolyte material. The solid electrolyte material contained in the solid electrolyte layer 40 is not particularly limited, and for example, a sulfide solid electrolyte material, an oxide solid electrolyte material, a nitride solid electrolyte material, a halide solid electrolyte material, and the like can be used.

The formation of the solid electrolyte layer 40 on the positive electrode active material layer 22 and the negative electrode active material layer 32 makes it possible to set the thickness of the solid electrolyte layer 40 to about several µm, so that the lamination space factor of the solid electrolyte can be reduced, and the electrical resistivity can be reduced. Further, according to a configuration described below, the solid-state battery 10 has an advantage that the insulation between the electrodes can be ensured although it has a thin solid electrolyte layer and the manufacturing process and the structure thereof can be simplified.

[Laminate]

Figure 2:
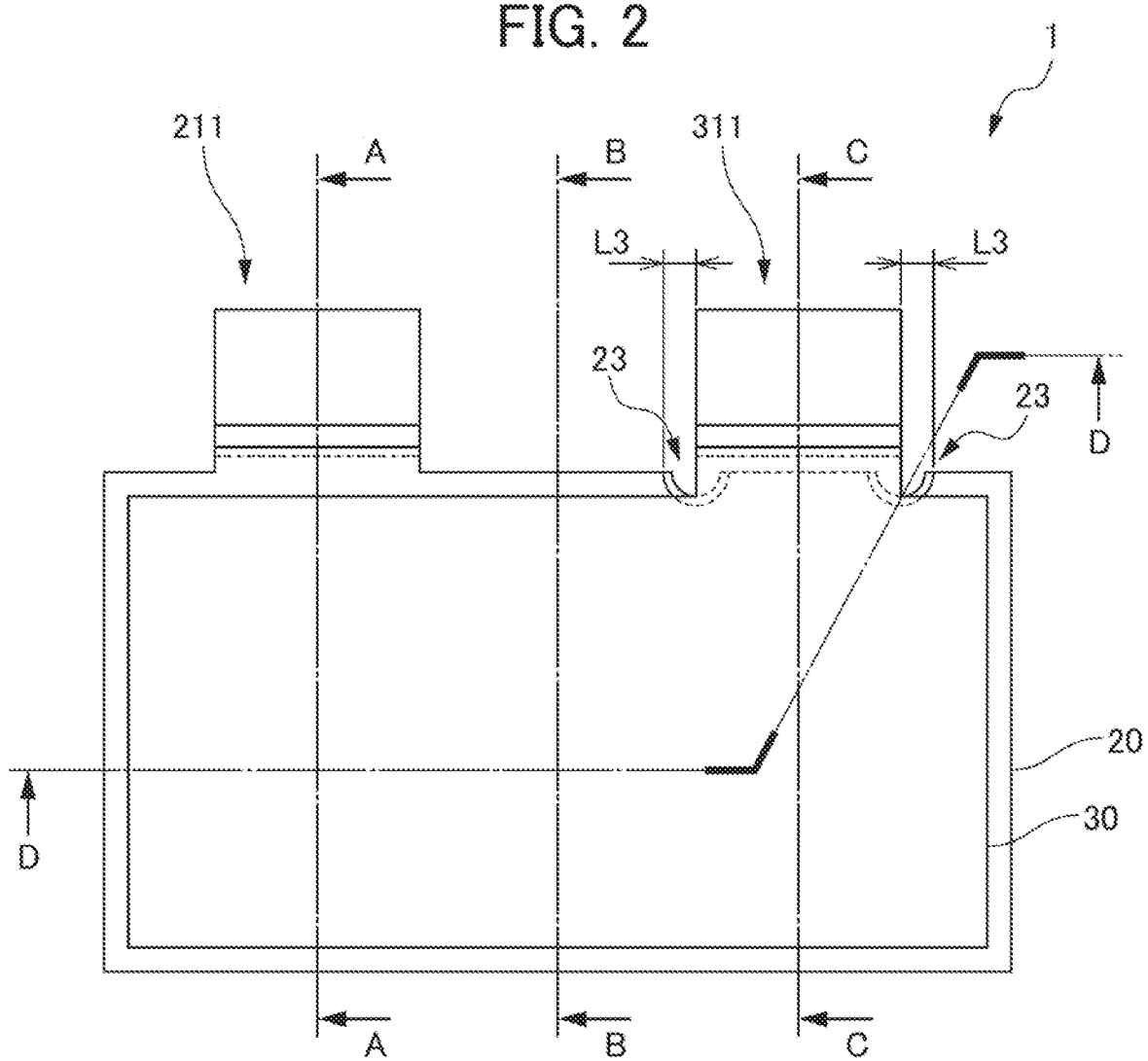
FIG. 2 is a diagram showing an outline of a laminate according to the first embodiment of the present invention.

FIG. 2 is a diagram showing an outline of the laminate 1 according to the present embodiment. In the present embodiment, the area of the lamination surface of the positive electrode plate 20 as one of the electrode plates is larger than the area of the lamination surface of the negative electrode plate 30 as the other electrode plate. The outer edge of the positive electrode plate 20 is positioned outside the outer edge of the negative electrode plate 30 so as to include the outer edge of the negative electrode plate 30. As a result, as shown in FIGS. 3A to 3C, an insulation distance L1 can be ensured between the end face of the positive electrode plate 20 and the end face of the negative electrode plate 30. In the following description, one electrode plate will be described as a positive electrode plate 20 and the other electrode plate will be described as a negative electrode plate 30. However, one electrode plate may be a negative electrode plate and the other electrode plate may be a positive electrode plate.

Concave portions 23 are formed on the end face of the positive electrode plate 20, which is one electrode plate. As shown in FIG. 2, the concave portions 23 are arranged at positions corresponding to both end portions of the negative electrode tab 311. The solid electrolyte layer 40 is formed on the end faces of the concave portions 23. As a result, an insulation distance L3 can be ensured between a portion of the positive electrode plate 20 excluding the concave portions 23 and the negative electrode tab 311.

Figure 3D:
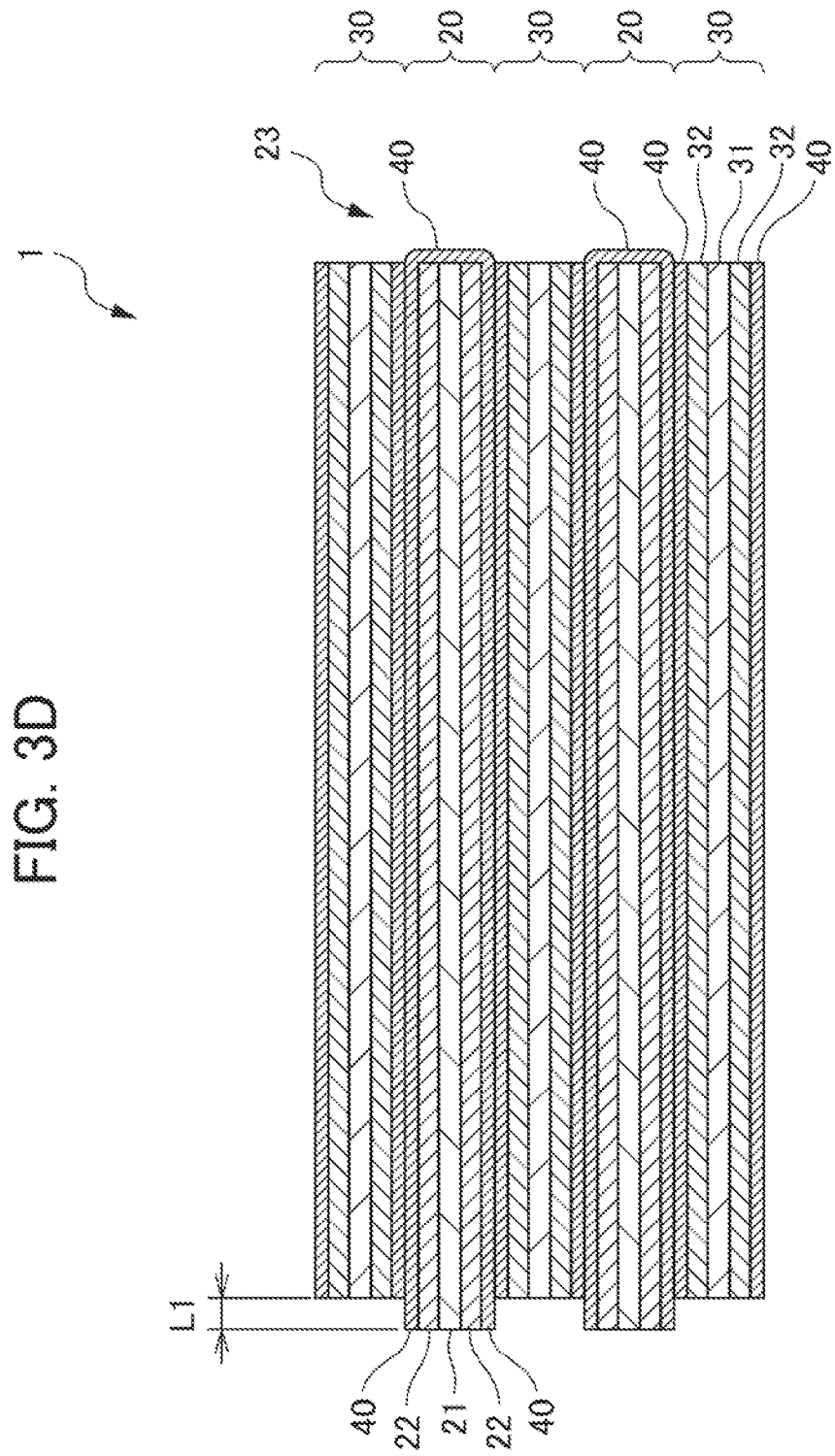
FIG. 3D is a cross-sectional view taken along a line D-D of FIG. 2.

As shown in FIG. 3C, the solid electrolyte layer 40 having a certain length L2 in a tab extending direction is formed on the lamination surfaces of the negative electrode tab 311. As a result, an insulation distance L2 can be ensured between the negative electrode tab 311 and the end face of the positive electrode plate 20. On the other hand, since the negative electrode tab 311 does not have the solid electrolyte layer 40 on the end face thereof, an insulation distance on an intersection line between the end face of the negative electrode tab 311 and the end face of the positive electrode plate 20 cannot be ensured when the positive electrode plate 20 does not have the concave portion 23. However, in the present embodiment, as shown in FIG. 3D, the positive electrode plate 20 has a pair of concave portions 23 having the solid electrolyte layer 40 formed thereon in a range including the intersection line between the positive electrode plate 20 and the end face of the negative electrode tab 311, that is, at positions corresponding to both end portions of the negative electrode tab 311, so that the insulation between the positive electrode plate 20 and the negative electrode tab 311 can be ensured.

<Method of Manufacturing Solid-state Battery>

Figure 11:
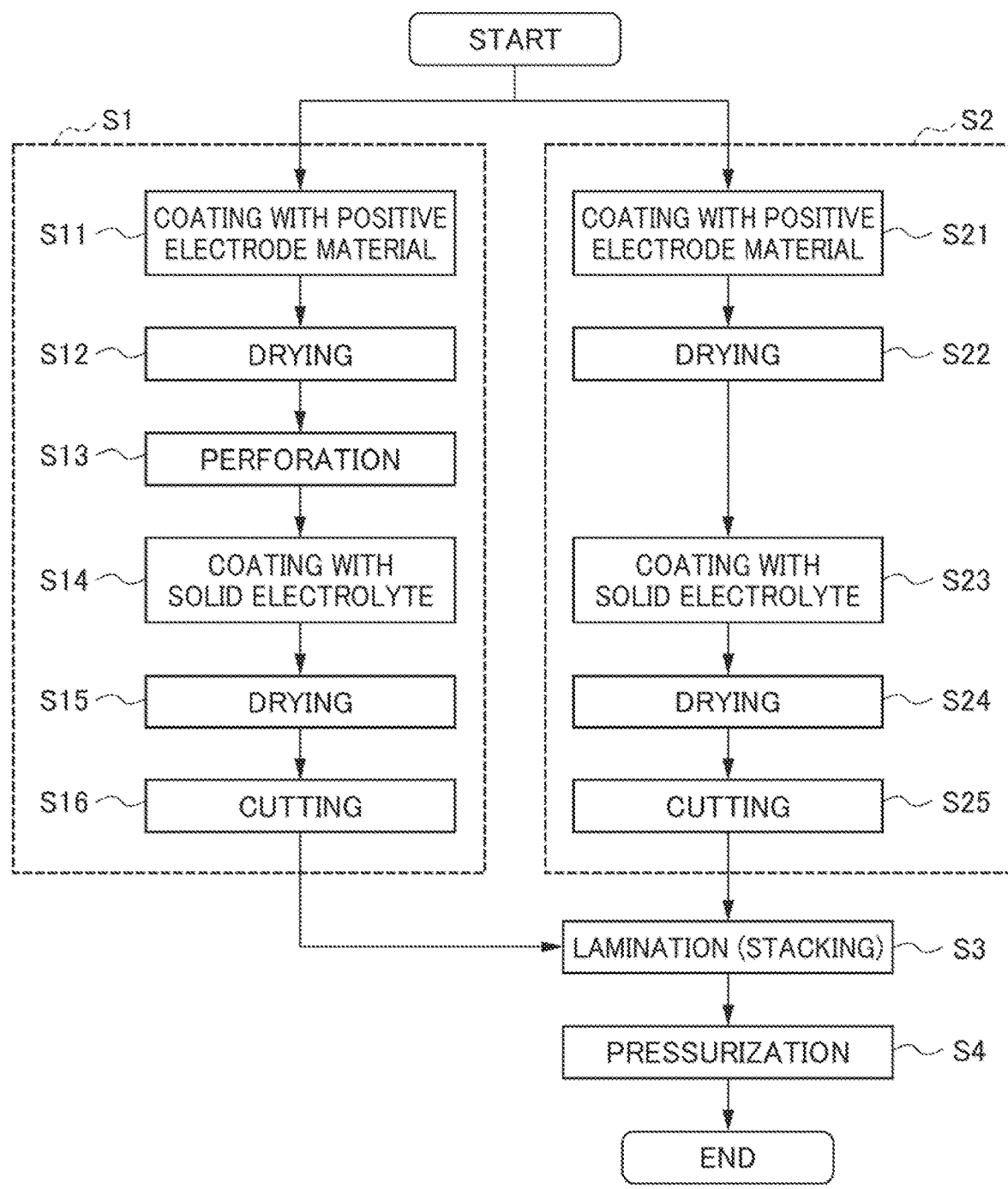
FIG. 11 is a flowchart showing a process for manufacturing the solid-state battery according to the first embodiment of the present invention.

As shown in FIG. 11, a method of manufacturing the solid-state battery according to the present embodiment includes a positive electrode plate producing process S1, a negative electrode plate producing process S2, a laminating step S3, and a pressurizing step S4.

As shown in FIG. 11, the positive electrode plate producing process S1 includes a positive electrode material coating step S11, a drying step S12, a perforating step S13, a solid electrolyte coating step S14, a drying step S15, and a cutting step S16 in this order.

Figure 8:
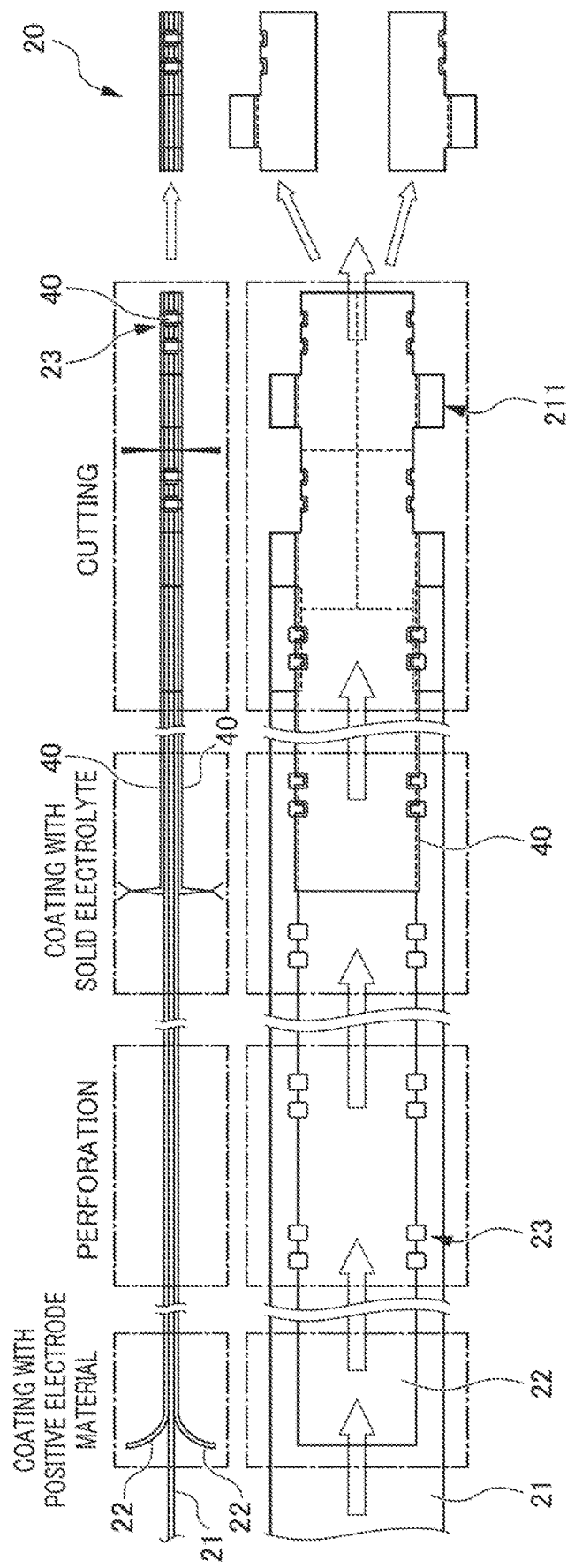
FIG. 8 is a diagram showing a process for manufacturing an electrode for a solid-state battery according to the first embodiment of the present invention.

As shown in FIG. 8, the positive electrode material coating step S11 is a step of forming the positive electrode active material layer 22 on both surfaces of the sheet-shaped positive electrode current collecting plate 21. The method of forming the positive electrode active material layer 22 is not particularly limited, and examples thereof include a method of preparing a positive electrode mixture containing the positive electrode active material and applying the positive electrode mixture onto a positive electrode current collector. The method of applying the positive electrode mixture is not particularly limited, and examples thereof include a doctor blade method, spray coating, screen printing, or the like. The drying step S12 is a step of drying the coated positive electrode mixture, and the drying method is not particularly limited.

The perforating step S13 is a step of forming holes in the sheet-shaped positive electrode current collecting plate 21 having the positive electrode active material layer 22 on both surfaces thereof. The method of forming the holes is not particularly limited, and conventionally known methods such as a method of punching with a punching die, laser processing, and the like can be used.

As shown in FIG. 8, the solid electrolyte coating step S14 is a step of forming the solid electrolyte layer 40 on both the surfaces of the sheet-shaped positive electrode current collecting plate 21 having the positive electrode active material layers 22 formed on both the surfaces thereof and the holes formed therein. The method of forming the solid electrolyte layer 40 is not particularly limited, and examples thereof include a method of applying a solid electrolyte by a doctor blade method, a spray coating, screen printing, or the like as in the positive electrode material coating step S11. By coating the positive electrode current collecting plate 21 having the holes with the solid electrolyte, the solid electrolyte spreads over the end faces of the holes, so that the solid electrolyte layer 40 can also be formed on the end faces of the holes. The drying step S15 is a step of drying the coated solid electrolyte layer 40, and the drying method is not particularly limited.

The cutting step S16 is a step of cutting the sheet-shaped positive electrode current collecting plate 21 along cutting lines extending across the holes formed in the perforating step S13 to produce the positive electrode plates 20 having the concave portions 23 formed on the end faces thereof. Further, the positive electrode tab 211 is formed in the cutting step S16.

According to the positive electrode plate producing process S1 including the above steps, it is possible to produce the positive electrode plate 20 having the concave portions 23 formed on the end face thereof and the solid electrolyte layer 40 formed on the end faces of the concave portions 23. In other words, the feature in which cutting the sheet-shaped positive electrode current collecting plate 21 is preceded by coating the end faces of the holes with the solid electrolyte makes it possible to produce the positive electrode plate 20 having the solid electrolyte layer 40 formed on at least a part of the end face thereof, which is preferable from the viewpoint of the production efficiency of the positive electrode plate 20.

Figure 9:
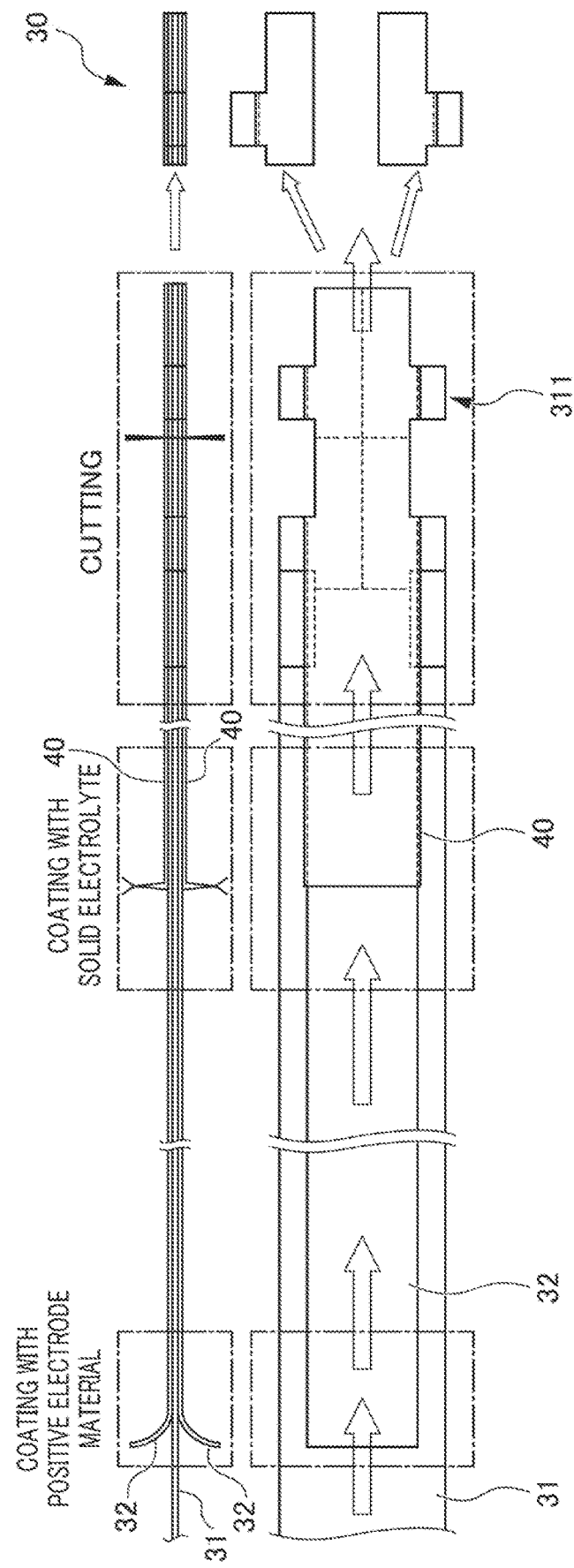
FIG. 9 is a diagram showing the process for manufacturing the electrode for the solid-state battery according to the first embodiment of the present invention.

As shown in FIG. 11, the negative electrode plate producing process S2 includes a negative electrode material coating step S21, a drying step S22, a solid electrolyte coating step S23, a drying step S24, and a cutting step 25 in this order. As shown in FIG. 9, the steps of the negative electrode plate producing process S2 are the same as the steps of the positive electrode plate producing process S1, except that the negative electrode plate producing process S2 does not have the perforating step S13.

The laminating step S3 is a step of laminating the positive electrode plate 20 produced in the positive electrode plate producing process S1 and the negative electrode plate 30 produced in the negative electrode plate producing process S2.

The pressurizing step S4 is a step of pressurizing the laminated positive and negative electrode plates 20 and 30 while pinching the them by a press machine or the like to integrate them.

Hereinafter, other embodiments of the present invention will be described. The description on the same configuration as the foregoing configuration may be omitted.

Second Embodiment

Figure 4:
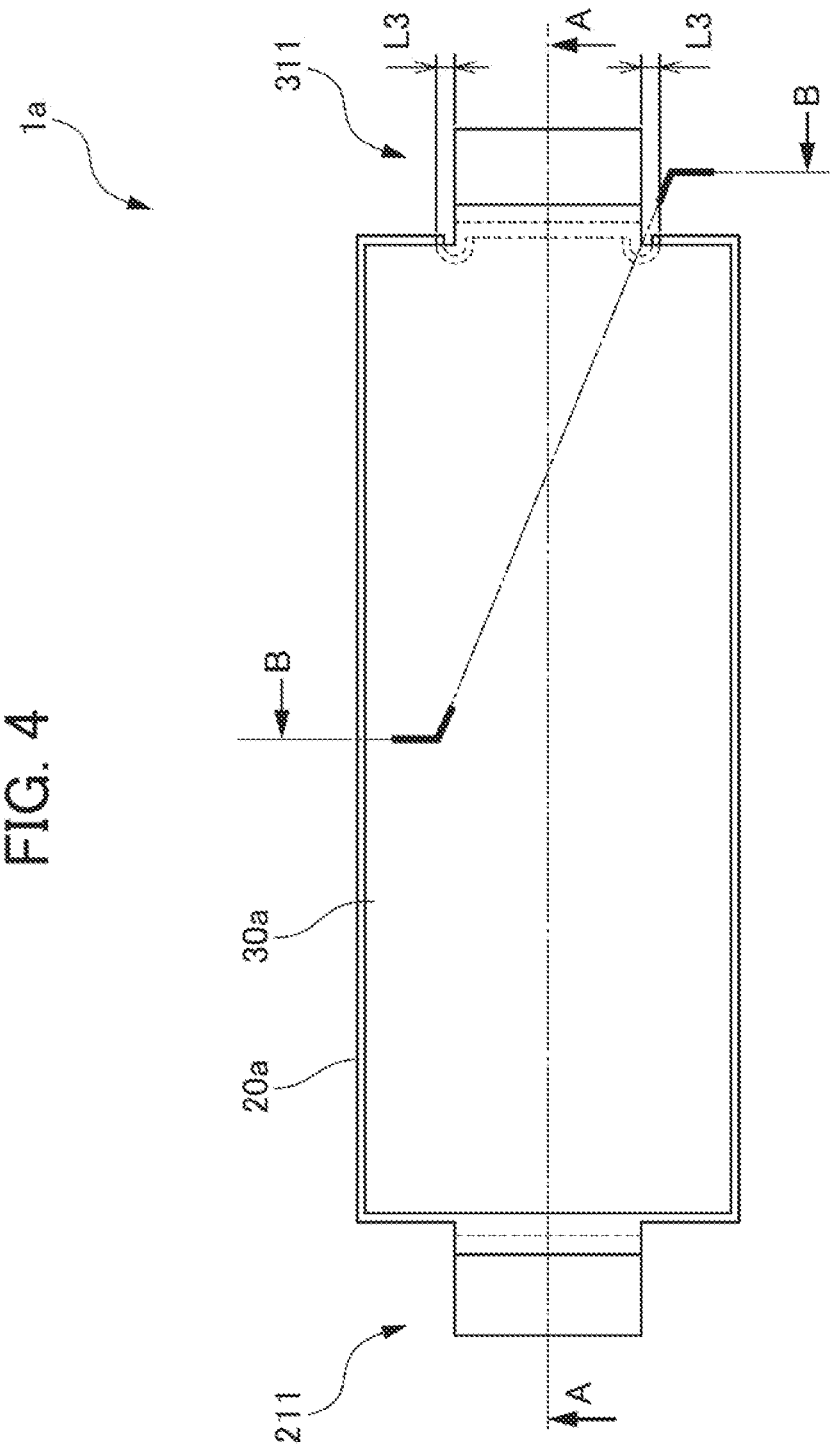
FIG. 4 is a diagram showing an outline of a laminate according to a second embodiment of the present invention.
Figure 5A:
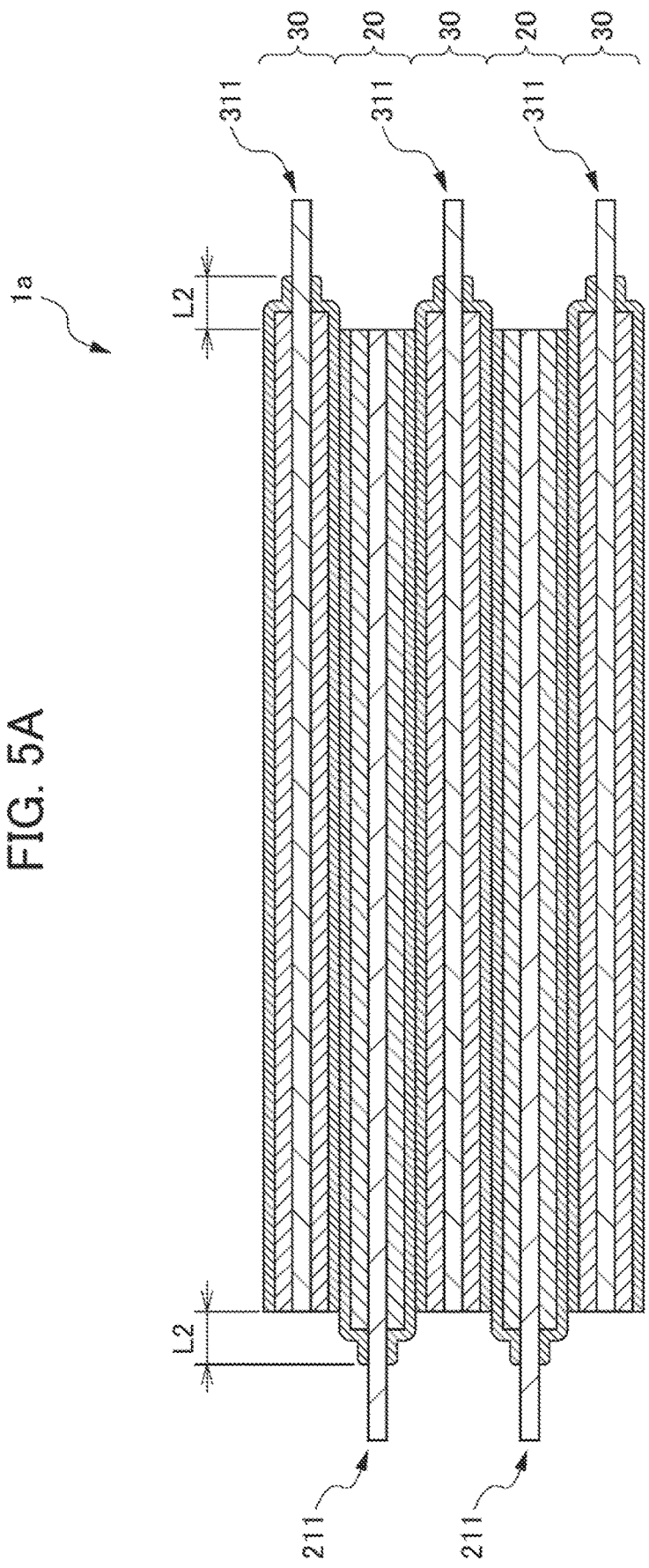
FIG. 5A is a cross-sectional view taken along a line A-A of FIG. 4.
Figure 5B:
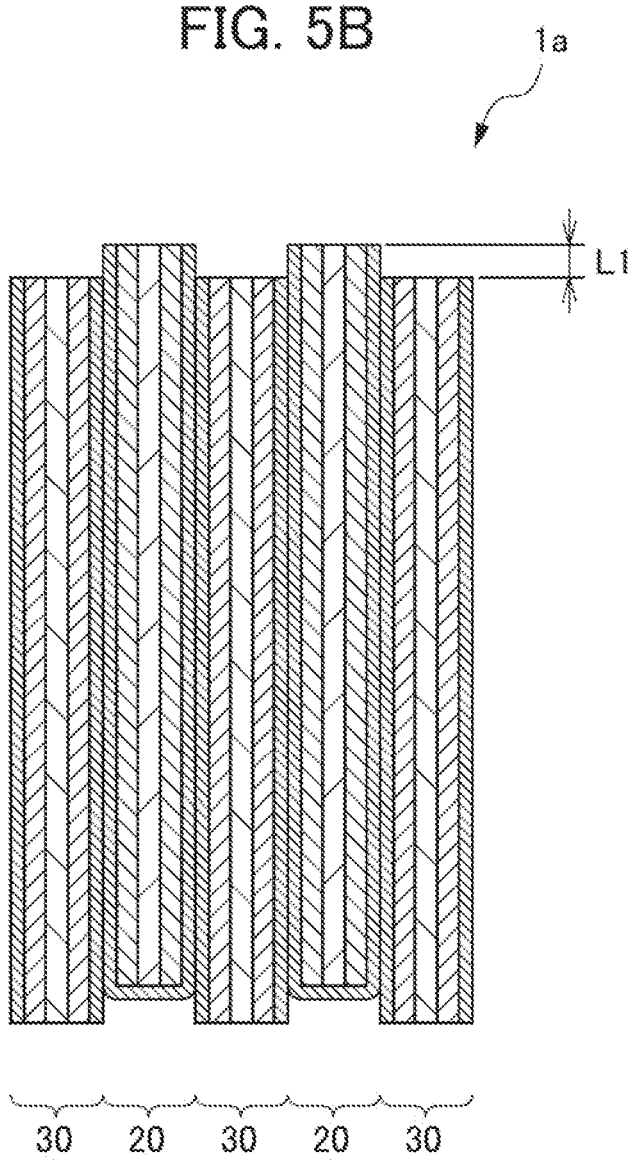
FIG. 5B is a cross-sectional view taken along a line B-B of FIG. 4.

FIG. 4 is a diagram showing an outline of a laminate 1*a* of a solid-state battery according to a second embodiment. The laminate 1*a* is formed by alternately laminating positive electrode plates 20*a* and negative electrode plates 30*a*. The laminate 1*a* includes a positive electrode tab 211 and a negative electrode tab 311 that extend in directions away from each other. Except for this, the configuration of the laminate 1*a* is the same as that of the laminate 1. The outer edge of the positive electrode plate 20*a* is positioned outside the outer edge of the negative electrode plate 30*a* so as to include the outer edge of the negative electrode plate 30*a*. As a result, as shown in FIGS. 5A and 5B, an insulation distance L1 can be ensured between the end face of the positive electrode plate 20*a* and the end face of the negative electrode plate 30*a*. Concave portions are formed on the end face of the positive electrode plate 20*a* which is the one electrode plate, and the concave portions are arranged at positions corresponding to both end portions of the negative electrode tab 311 as shown in FIG. 4. As described above, the configuration of the present invention can be applied to a solid-state battery having tabs extending in different directions and intended for use in a vehicle or the like.

Third Embodiment

Figure 6:
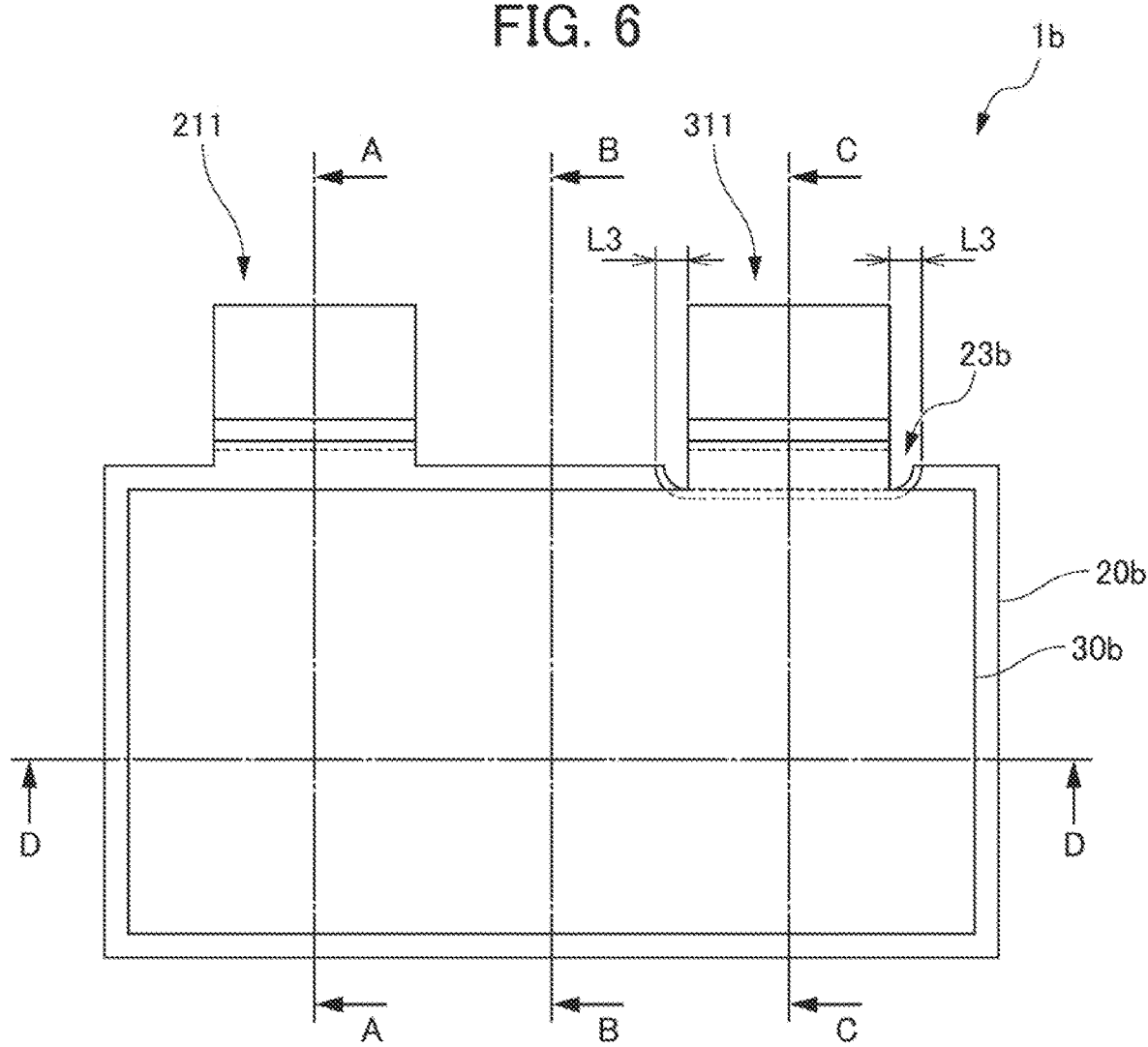
FIG. 6 is a diagram showing an outline of a laminate according to a third embodiment of the present invention.
Figure 7B:
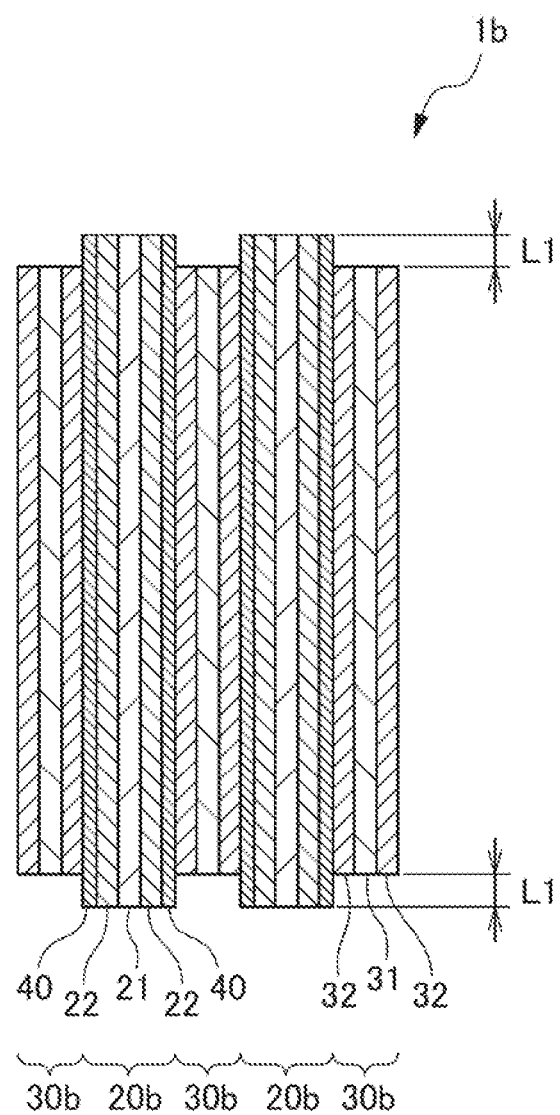
FIG. 7B is a cross-sectional view taken along a line B-B of FIG. 6.

FIG. 6 is a diagram showing an outline of a laminate 1*b* of a solid-state battery according to a third embodiment. As shown in FIGS. 7A to 71D, the laminate 1*b* is formed by alternately laminating positive electrode plates 20*b* and negative electrode plates 30*b*. In the present embodiment, the solid electrolyte layer 40 is formed on the lamination surface of the positive electrode plate 20*b* which is the one electrode plate, but is absent from the lamination surface of the negative electrode plate 30*b* which is the other electrode plate. In the following description, as in the first embodiment, the configuration of the positive electrode plate 20*b* as the one electrode plate and the configuration of the negative electrode plate 30*b* as the other electrode plate may be exchanged with each other, and the one electrode plate may be used as a negative electrode plate while the other electrode plate may be used as a positive electrode plate.

As in the first embodiment, the area of the lamination surface of the positive electrode plate 20*b* as the one electrode plate is larger than the area of the lamination surface of the negative electrode plate 30*b* as the other electrode plate. The outer edge of the positive electrode plate 20*b* is positioned outside the outer edge of the negative electrode plate 30*b* so as to include the outer edge of the negative electrode plate 30*b*. As a result, as shown in FIGS. 7A to 7D, an insulation distance L1 can be ensured between the end face of the positive electrode plate 20*b* and the end face of the negative electrode plate 30*b*.

The negative electrode plate 30*b* does not have the solid electrolyte layer on the lamination surface thereof. Therefore, as shown in FIG. 7C, the solid electrolyte layer is also not formed on the surface of the negative electrode tab 311. It is accordingly necessary to ensure the insulation between the negative electrode tab 311 and the positive electrode plate 20*b*.

The concave portions 23*b* are formed on the end faces of the positive electrode plates 20*b*, which are each the one electrode plate. As shown in FIG. 6, the concave portion 23*b* is arranged at the position corresponding to the negative electrode tab 311. Unlike the concave portions 23, the concave portion 23*b* is a single concave portion, which is wider than the width of the negative electrode tab 311. The solid electrolyte layer 40 is formed on the end face of the concave portion 23*b*. The concave portion 23*b* makes it possible to ensure an insulation distance L3 between the negative electrode tab 311 and a portion of the positive electrode plate 20*b* excluding the concave portion 23*b*.

The positive electrode plate 20*b* has the concave portion 23*b* which is larger in width than the negative electrode tab 311, and the solid electrolyte layer 40 is formed on the end face of the concave portion 23*b* as shown in FIG. 7C. As a result, the insulation between the positive electrode plate 20*b* and the negative electrode tab 311 can be ensured.

The laminate 1*b* according to the present embodiment can ensure insulation from the positive electrode plate 20*b* without forming any solid electrolyte layer on the surface of the negative electrode plate 30*b*. As a result, it is possible to simplify the manufacturing process of the solid-state battery having the laminate 1*b*.

<Method of Manufacturing Solid-state Battery>

Figure 10:
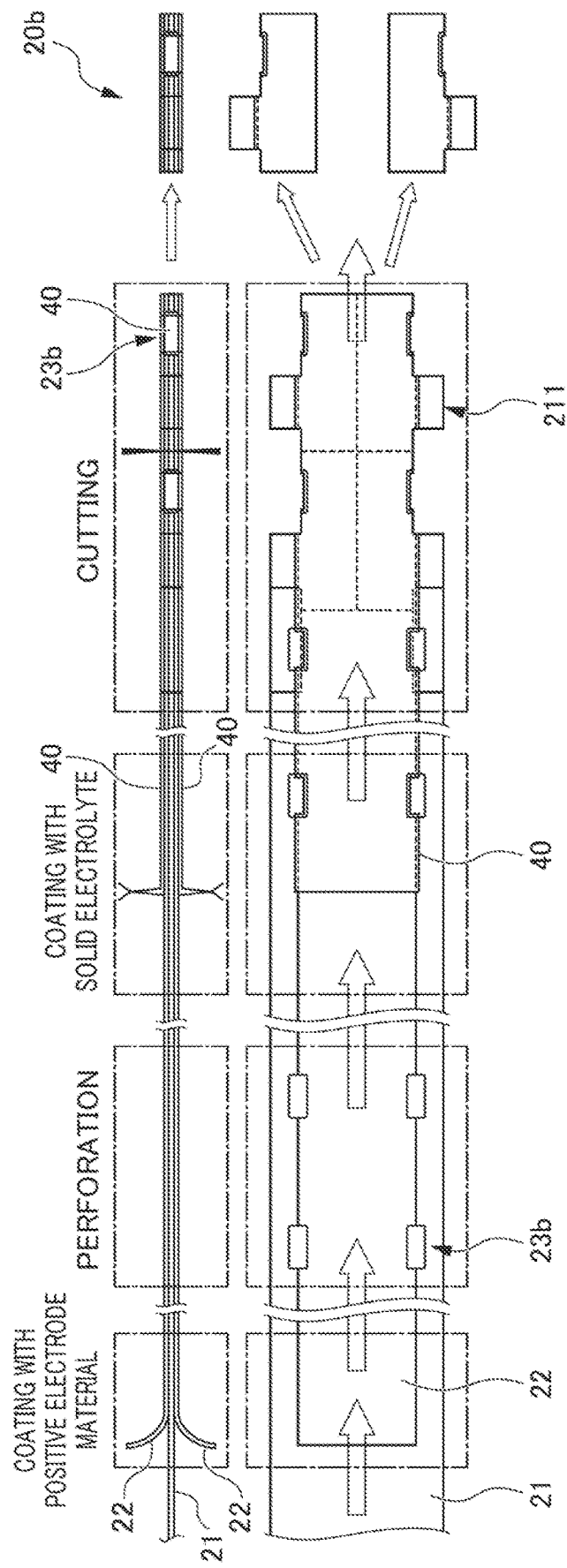
FIG. 10 is a diagram showing a process for manufacturing an electrode for the solid-state battery according to the third embodiment of the present invention.
Figure 12:
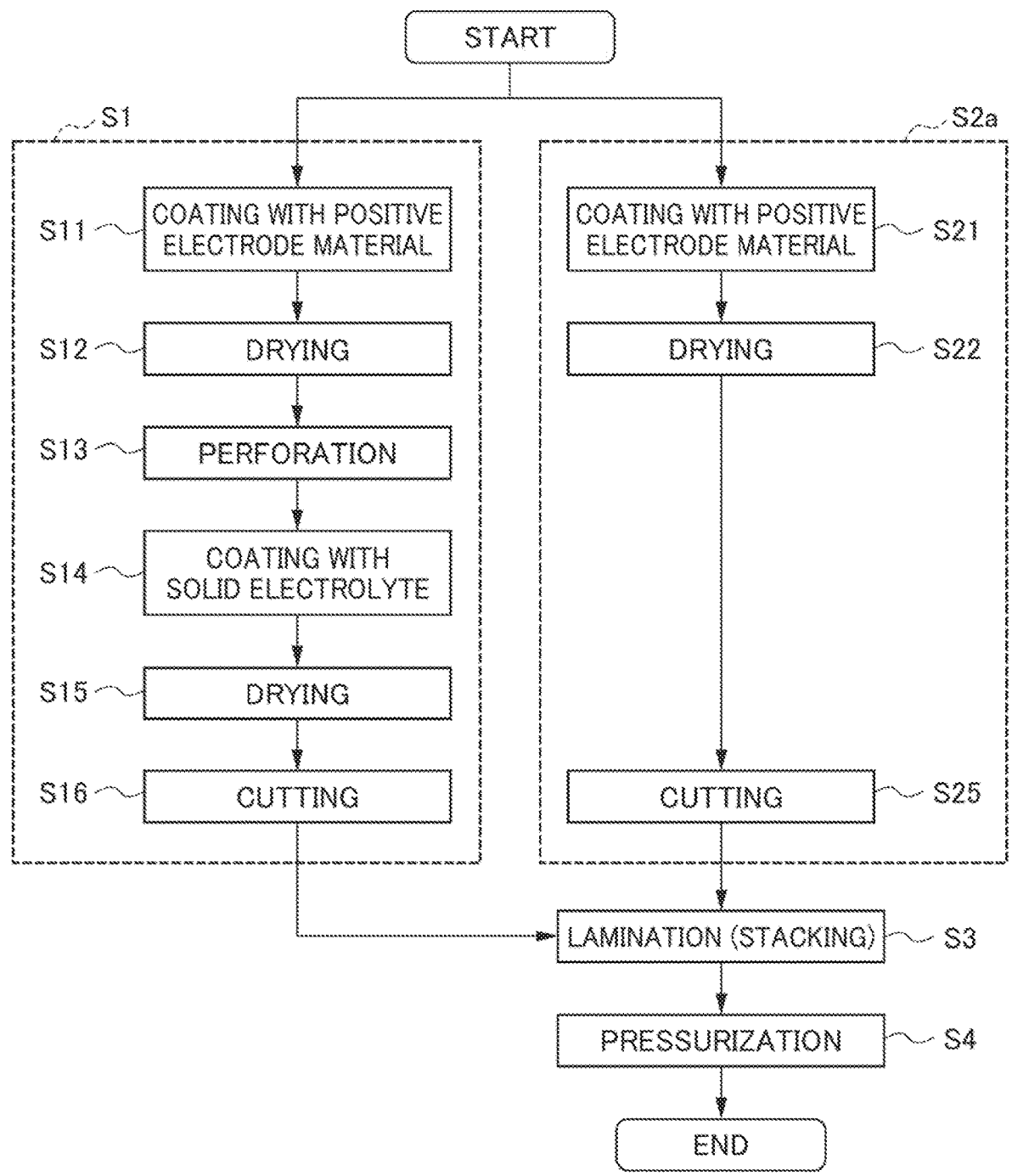
FIG. 12 is a flowchart showing a manufacturing process of the solid-state battery according to the third embodiment of the present invention.

As shown in FIG. 12, a method of manufacturing the solid-state battery according to the present embodiment includes a positive electrode plate producing process S1, a negative electrode plate producing process S2*a*, a laminating step S3, and a pressurizing step S4. The method of manufacturing the solid-state battery according to the present embodiment includes a positive electrode plate producing process shown in FIG. 10. The positive electrode plate producing process shown in FIG. 10 is the same as the positive electrode plate producing process S1 according to the first embodiment except that in the perforating step S13, a hole formed in such a size that the concave portion 23*b* larger in width than the negative electrode tab 311 can be formed.

As shown in FIG. 12, the negative electrode plate producing process according to the present embodiment includes a negative electrode plate producing process S2a. The negative electrode plate producing process S2a is the same as the negative electrode plate producing process S2 according to the first embodiment except that it does not include the solid electrolyte coating step S23 and the drying step S24. As a result, it is possible to simplify the manufacturing process of the solid-state battery.

As shown in FIG. 12, the method of manufacturing the solid-state battery according to the present embodiment includes the laminating step S3 and the pressurizing step S4 which are the same as those of the first embodiment.

While preferred embodiments of the present invention have been described above, the present invention is not limited to the above embodiments, and the scope of the invention also include appropriate modifications of the embodiments.

EXPLANATION OF REFERENCE NUMERALS

10: Solid-state battery
1, 1a, 1b: Laminate
20, 20a, 20b: Positive electrode plate (one electrode plate)
211: Positive electrode tab (electrode tab)
23, 23b: Concave portion
30, 30a, 30b: Negative electrode plate (the other electrode plate)
311: Negative electrode tab (electrode tab)
40: Solid electrolyte layer

What is claimed is:

1. A solid-state battery comprising:
    a laminate including a positive electrode plate and a negative electrode plate that are alternately laminated; and
    a solid electrolyte layer formed on a lamination surface of the positive electrode plate and a lamination surface of the negative electrode plate,
    the lamination surface of one electrode plate of the positive electrode plate and the negative electrode plate is larger in area than the lamination surface of the other electrode plate of the positive electrode plate and the negative electrode plate
    an outer edge of the one electrode plate is positioned outside an outer edge of the other electrode plate,
    the solid electrolyte layer is formed on at least a part of an end face of the one electrode plate,
    the end face of the one electrode plate has a concave portion that is formed at a position corresponding to an electrode tab extending from the other electrode plate, and
    the solid electrolyte layer formed on the other electrode plate extends on the concave portion.

2. The solid-state battery according to claim 1, wherein the concave portion is larger in width than the electrode tab.

* * * * *